Oct. 3, 1950    J. H. FURNAS    2,524,048
CHORE BOX FOR TRANSPORT
Filed Aug. 13, 1948    2 Sheets-Sheet 1

James H. Furnas
INVENTOR.

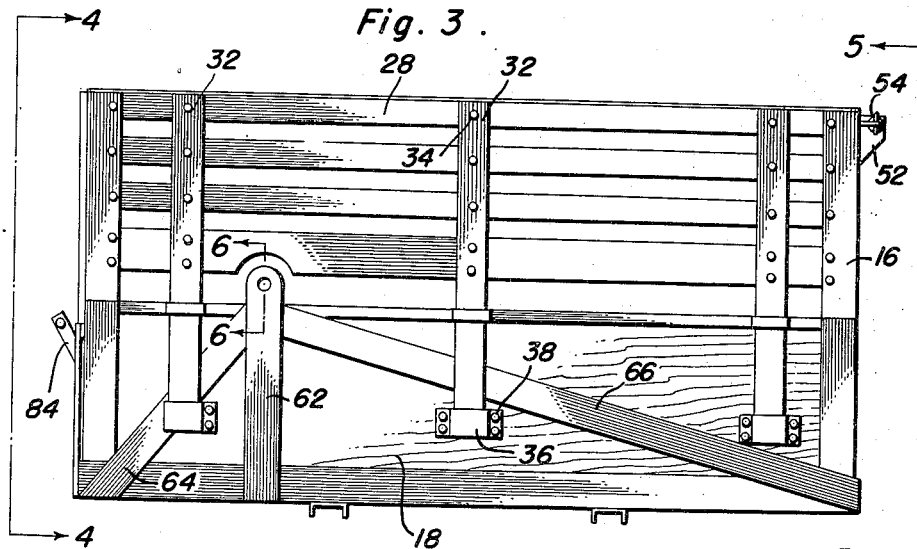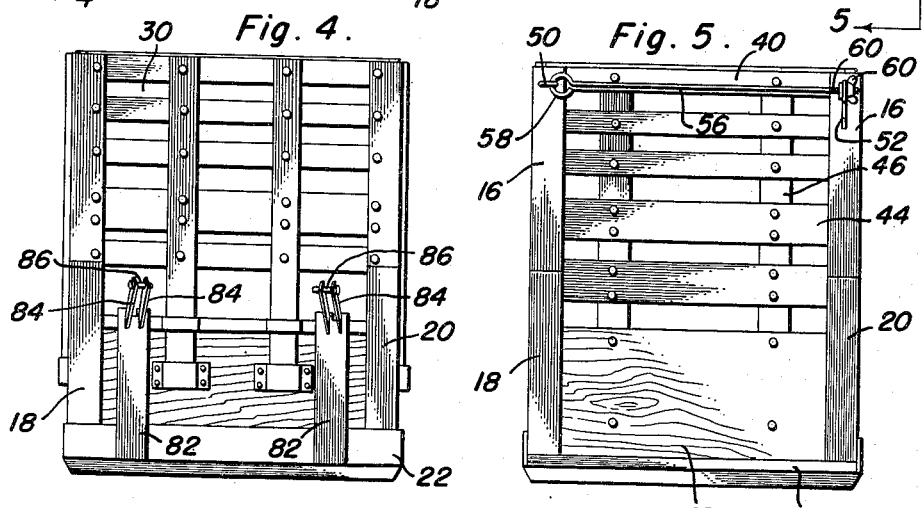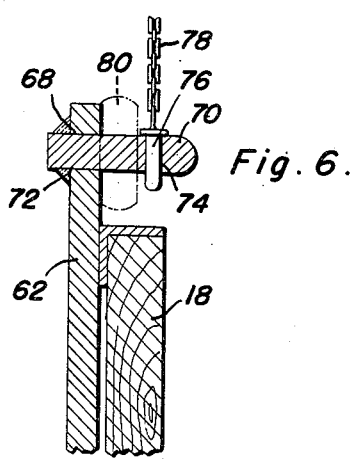
Oct. 3, 1950  J. H. FURNAS  2,524,048
CHORE BOX FOR TRANSPORT
Filed Aug. 13, 1948  2 Sheets-Sheet 2
James H. Furnas
INVENTOR.

Patented Oct. 3, 1950

2,524,048

UNITED STATES PATENT OFFICE 2,524,048

CHORE BOX FOR TRANSPORT

James H. Furnas, Muscatine, Iowa

Application August 13, 1948, Serial No. 44,056

3 Claims. (Cl. 214—130)

This invention relates to a box designed to operate on the hydraulic lift of a farm tractor the primary object of which is to haul pigs from the feed lot to the field, to haul feed, to haul hay and straw, to haul melons in from the field, and so forth.

Yet another object of this invention is to provide a novel box including means for removably attaching the box to an hydraulically operated draw bar of a tractor whereby the box may be lowered to the ground or raised therefrom or entirely detached from the tractor.

Yet another object of this invention is to provide a device of the character described including a sliding door carried at the end of the box and means for retaining the door in closed or open position upon the box.

Another object of this invention is to provide a box which is simple in construction and is fabricated of inexpensive material and which can be easily operated by the driver of the tractor.

These, together with various ancillary objects and features of the invention which will later become apparent as the following description proceeds, are attained by the device, a preferred embodiment of which has been illustrated by way of example only in the accompanying drawings, wherein:

Figure 3 is a side elevational view of the box detached from the tractor;

Figure 4 is an end elevational view taken from the plane of the section line 4—4 of Figure 3 and looking in the direction of the arrows;

Figure 5 is an end elevational view taken substantially in the plane of the section line 5—5 of Figure 3 and looking in the direction of the arrows; and Figure 6 is a sectional view taken substantially in the plane of section line 6—6 of Figure 3.

Specific reference is now made to the drawings. In the several views in the accompanying drawings and in the following specification similar reference characters indicate corresponding elements throughout.

Indicated generally at 10 is the rear end of a tractor which is provided with a pair of draw bars 12 and hydraulically operated means 14 for raising and lowering the tractor draw bars.

The box of the instant invention is detachably secured to the ends of the tractor draw bar 12, the exact construction of which will follow hereinafter.

Figure 2:
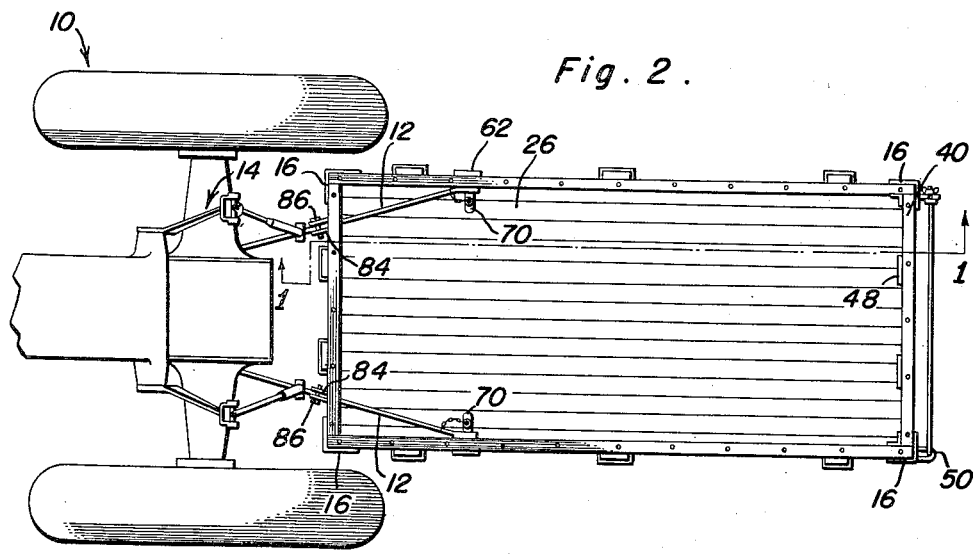
Figure 2 is a top plan view of the device attached to the rear end of a tractor.

As will be seen in Figure 2, the box is constructed of four vertically extending corner angles 16 to the bottom portions of which are secured, as by welding or riveting, relatively wide plates 18 and 20 forming the bottom portions of the side members of the box. Transversely extending angles 20 and 22 interconnect the forward and rear angles. The base member 24 of the box consists essentially of a plurality of transversely spaced longitudinally extending bars 26 secured at their ends to the side plates 18 and 20 thus forming an open ended box.

The side members of the box include longitudinally extending vertically spaced bars 28 while the front member of the box is also provided with transversely extending longitudinally spaced bars 30. To reinforce the side members a plurality of longitudinally spaced vertically extending bars 32 are provided which are welded or riveted as at 34 to the longitudinally extending bars 28 the bottom end of which are retained in brackets 36 secured as by rivets 38 to the relatively wide side plates 18 and 20.

Slidably retained between the rear angles 16 is a door 40 which is constructed of a relatively wide bottom plate 42 and a plurality of vertically spaced transversely extending bars 44 to which are riveted a plurality of vertically extending reinforcing bars 46. To prevent the door from moving inwardly into the box, a transversely extending cleat 48 is positioned behind the door.

To retain the door on the box in closed position, the following means is provided. To one of the angles 16 is secured a horizontal eye 50 while to the other rear angle 16 is secured a bracket 52 having a slot 54 at the top thereof. A transversely extending bar 56 is provided having an eye 58 at one end engageably received in the eye 50 and a screw threaded portion 60 at the other end which is supported upon the bracket 52 through the slot 54 and is retained thereon by means of an internally threaded nut such as a wing nut 60.

At this point, the means for detachably securing the box to the hydraulically operated draw bar will be described. To the outside of each of the side members is secured a vertical standard 62 further supported upon the side members by means of the diagonal braces 64 and 66. The top end of the vertical standard 62 is provided with a horizontal aperture 68 through which extends a bolt 70 having a headed portion 72 abutting the outer surface of the standard 62. The bolt 70 is further provided with a vertical aperture 74 for retaining a pin 76 to which is secured a chain 78 for retracting the pin when desired. Journaled upon the bolt 70 is the rear apertured ends 80 of the tractor draw bars 12.

Figure 1:
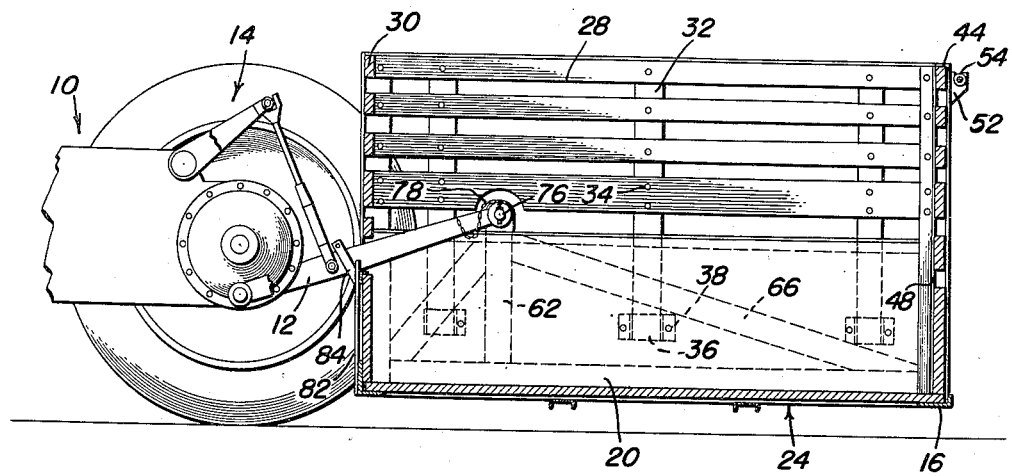
Figure 1 is a longitudinal sectional view of the device taken substantially in a plane of section line 1—1 of Figure 2.

To the front angle 22 is secured a pair of transversely spaced vertical bars 82 each of which bars is provided at its top ends with upwardly and forwardly inclined parallel arms 84 having apertures at the top end thereof for removably receiving a pin 86 therethrough. As will be seen more clearly in Figures 1 and 2, each of the tractor draw bars 12 extend between the arms 84 on each of the bars 82.

Thus it will be seen that by merely raising and lowering the tractor draw bars 12 the novel box of the instant invention will be accordingly raised and lowered as desired. To remove the box entirely from the draw bar all that need be done, therefore, is to remove the pins 86 and the bolt 70 whereby the tractor draw bars become disengaged from the box. To hitch the box to the tractor, the tractor is backed into the box with the draw bar in a raised position. The draw bars are then lowered and attached to the standard 82 by means of the bolt 70. Then the draw bars are raised slowly so that they are guided between the arms 84 of the support 82 and then the pins 86 are inserted in the arms 84. In this position, the box is ready for transport.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and, the scope of the appended claims.

Having described the invention, what is claimed as new is:

1. In a tractor having hydraulically operated drawbars, a box for transporting a variety of materials comprising, a base member, side members secured to said base member, a front member carried by said base and side members, a door slidably carried at the rear of said side and base members, means for retaining said door in closed position upon the box, and means for removably attaching the box to the drawbars for raising and lowering the box, said last-named means including, a pair of vertical transversely spaced bars secured to said front member, each bar carrying at its upper end upwardly inclined apertured parallel arms and a pin removably positioned in the apertures of said arms, each of said tractor drawbars extending between said parallel arms, a vertical standard secured to each of said side members, an aperture at the end of said standard, a headed bolt extending through said aperture, a vertical bore through the free end of said bolt, and a retaining pin removably positioned in said vertical bore, the end of said tractor drawbar being journaled on said bolt between said retaining pin and said vertical standard.

2. The combination of claim 1 wherein said side members include longitudinally extending spaced bars and vertically extending spaced reinforcement members.

3. The combination of claim 2 wherein said front, side and door members include relatively wide plates carried at the bottom of said members.

JAMES H. FURNAS.

REFERENCES CITED

The following references are of record in the file of this patent:

UNITED STATES PATENTS

| Number | Name | Date |
|---|---|---|
| 2,290,738 | Chadwick, Jr. | July 21, 1942 |
| 2,326,197 | Blecha | Aug. 10, 1943 |
| 2,379,797 | Gilbert | July 3, 1945 |
| 2,464,224 | Grabert | Mar. 15, 1949 |